United States Patent [19]

Anderson et al.

[11] Patent Number: 4,647,085
[45] Date of Patent: Mar. 3, 1987

[54] SEALING ARRANGEMENT FOR PIN AND BOX THREADED CONNECTION OF TUBULAR MEMBERS

[76] Inventors: Edwin A. Anderson; Derrel D. Webb, both of P.O. Box 567, Houston, Tex. 77001

[21] Appl. No.: 805,542

[22] Filed: Dec. 6, 1985

[51] Int. Cl.⁴ .............................................. F16L 25/00
[52] U.S. Cl. .................................. 285/333; 285/302; 285/334.1; 285/351; 285/355; 285/375
[58] Field of Search ............... 285/333, 334, 355, 390, 285/351, 40, 332.2, 332.3, 334.1, 375, 3, 4, 302

[56] References Cited

U.S. PATENT DOCUMENTS 2,216,945  10/1940  Hinderliter ..................... 285/333 X
2,320,107   5/1943  Speckert ......................... 285/333 X

FOREIGN PATENT DOCUMENTS 380450  9/1932  United Kingdom ................ 285/333

Primary Examiner—Richard J. Scanlan, Jr.
Attorney, Agent, or Firm—Jack W. Hayden

[57] ABSTRACT

A sealing arrangement for the pin and box of a threaded connection between tubular members includes annular piston means for positioning in the box of one of the tubular members. Resilient seal means supported on the piston means seals between the pin end, box and piston means when the pin is threadedly engaged in the box. Additional seal means on the piston means is responsive to fluid pressure in the tubular members whereby the piston means may be urged toward sealing engagement with the pin end and the resilient seal means.

12 Claims, 8 Drawing Figures

FIG. 3
FIG. 4
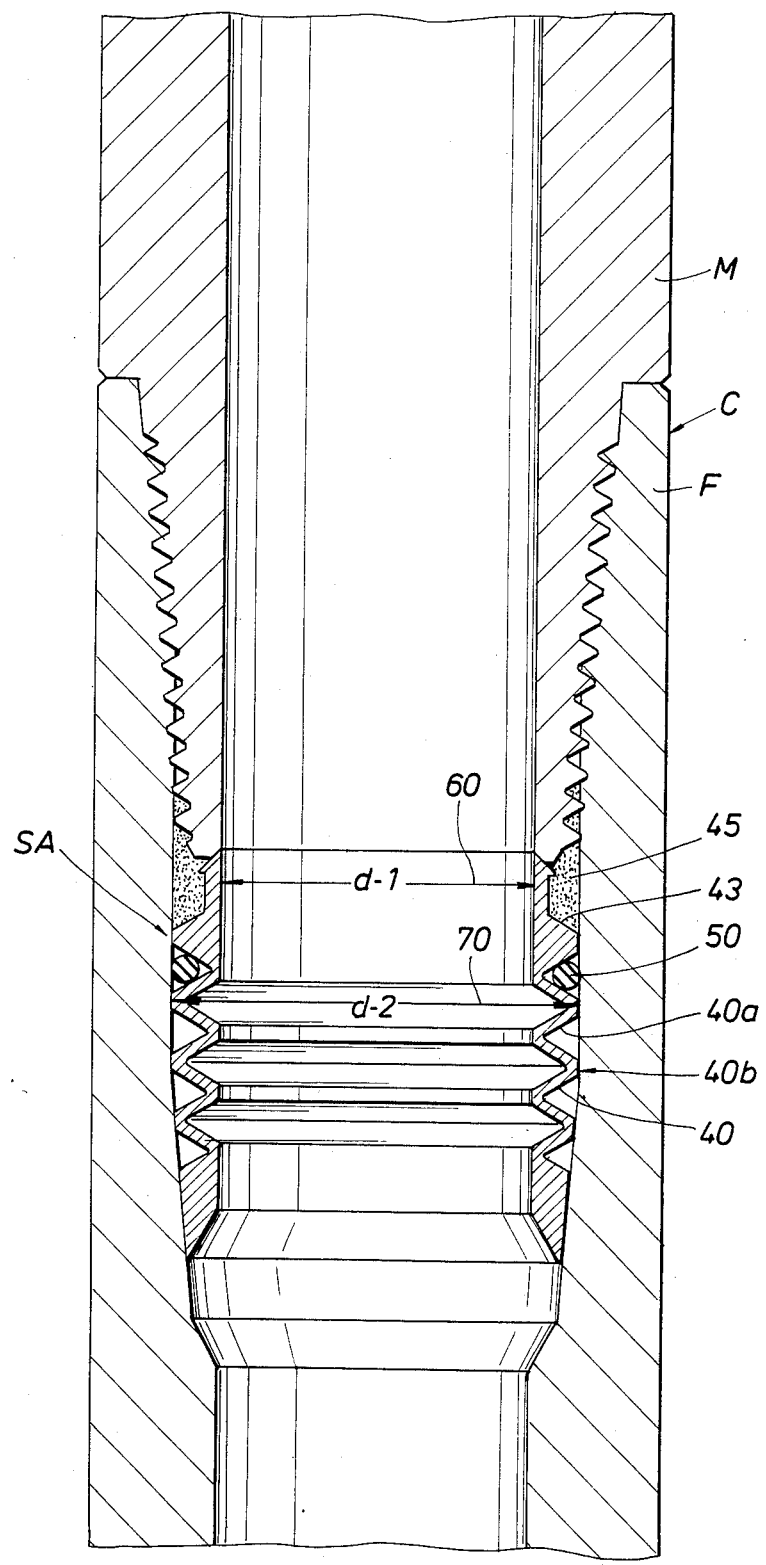
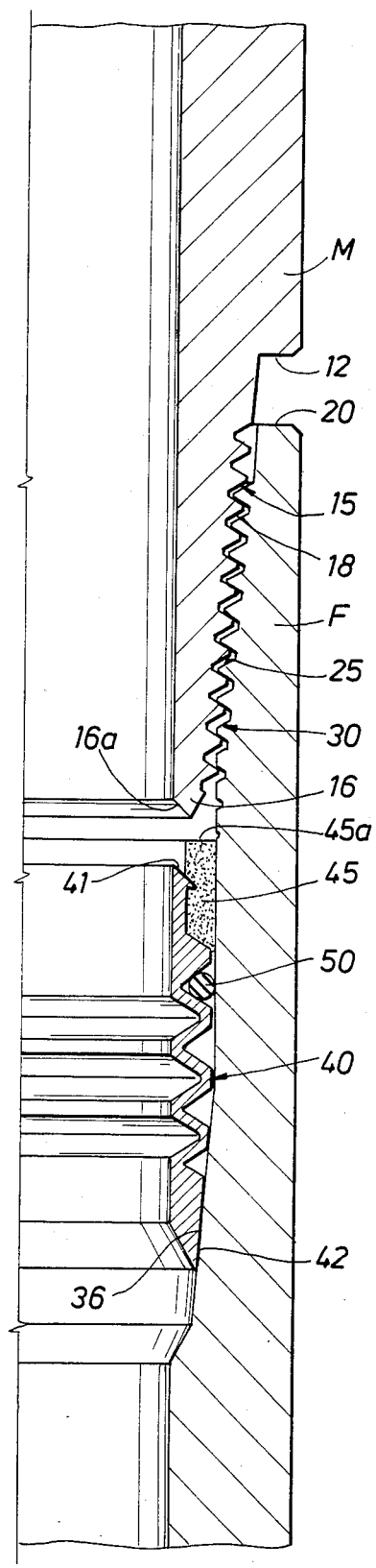

FIG.5
FIG.6
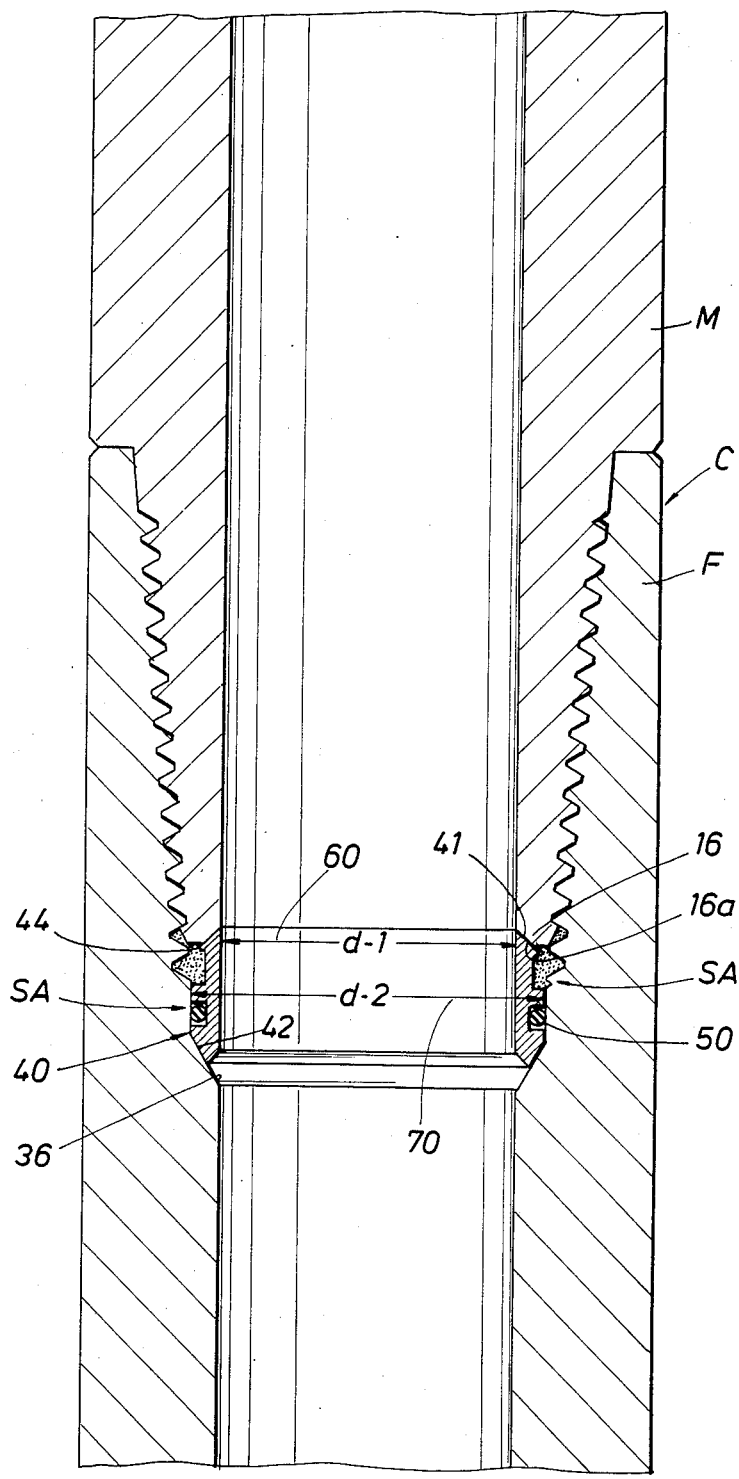
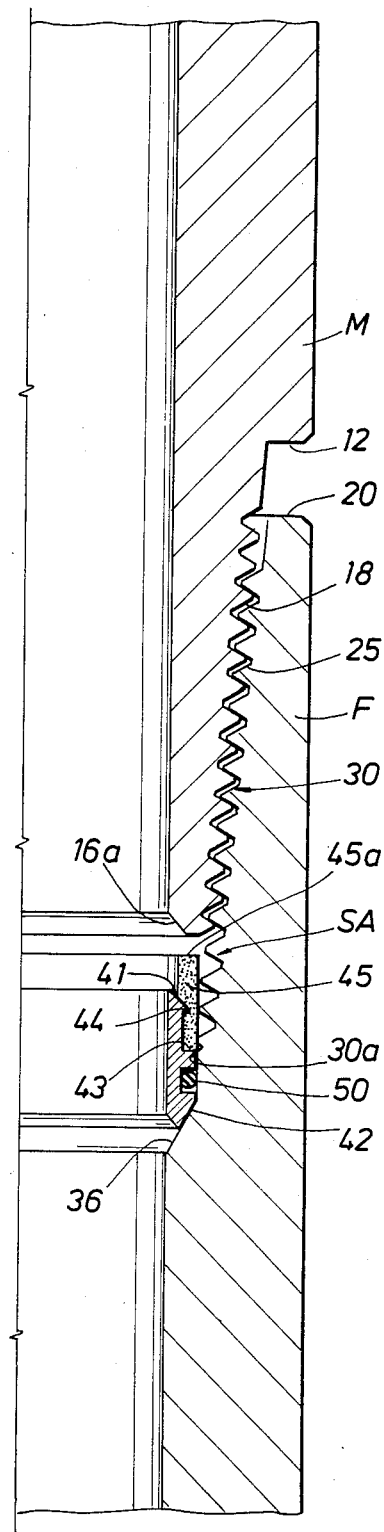

SEALING ARRANGEMENT FOR PIN AND BOX THREADED CONNECTION OF TUBULAR MEMBERS

BACKGROUND OF THE INVENTION

Various arrangements have been attempted to provide seals in oil field tubular connections used in drilling and producing oil and gas wells. Tubular members such as drill pipe and drill collars and the like employed in drilling an oil or gas well are provided with what is normally termed a threaded male pin end and a threaded male box end. When the pin and box are threadedly connected together, shoulders on the tubular members adjacent the threads are engaged. Various attempts have been made to seal the threaded connection to prevent fluids circulated through the tubular members during the drilling operation from exerting stress loads at the abutting shoulders and from contacting the threaded connection formed by the tubular members.

The drilling fluid circulated through the drill string during drilling operations is circulated under substantial pressure and any slight leakage from the threaded connection between adjacent tubular members will quickly cause a "washout" at the shouldered connection requiring the removal of the drill string and replacement of the tubular members where the washout occurs.

"Washout" in a drill string is one of the serious problems encountered in drilling oil and gas wells, and the stress build-up in the tool joints due to such hydraulic pressure is another. Although the drill string members are generally made to API standards, the length of the threaded pin end may vary somewhat from one tubular member to the next. Thus, a seal which might function between two specific tubular members may not function if the next tubular member has a slightly different pin end length so that the seal does not properly engage to prevent fluid contact with the shouldered threaded connection formed between adjacent connected tubular members.

Other types of seals presently employed may require major alteration of the threaded tubular members for receiving the seals, or require some type of internal groove arrangement for receiving a seal therein. Where major alterations of threaded members are required, or even where an internal groove is required in at least one of the tubular members forming the threaded connection, substantial expense may be involved, and some difficulty may be encountered in retrofitting existing drill pipe and drill collars to such sealing arrangements. Also, seals in grooves are generally exposed to the interior of the drill string so that they may be readily dislodged by the fluid circulating therethrough under pressure, or may be subjected to dislodgement by operations conducted in the drill string such as wire line operations, logging tools, stimulation and cementing plugs, drop balls and the like.

SUMMARY OF THE INVENTION

The present invention provides a sealing arrangement for a threaded connection formed adjacent the abutting shoulders of tubular members for overcoming the above and other objections. The seal arrangement of this invention includes a plurality of seals for preventing contact of fluid passing through the tubular members with the threaded connection and the abutting shoulders on the tubular members. It can be applied to tubular members commonly employed in oil and gas well drilling as well as tubulars employed in producing operations without modification or with minimum modification of the tubular members.

The seal arrangement is not exposed to the interior of the tubular member in a manner so that it is readily dislodged or displaced so as to disrupt the seal. The sealing arrangement of this invention is constructed and arranged so that it is initially activated or energized by mechanical loading when the pin end of one tubular member is threadedly engaged into the box end of another tubular member as the threaded connection is made up, and after the threaded connection is made up with the seal in position, fluid pressure in the tubular members energizes the seal arrangement to aid in maintaining the seal in position and reducing the stress load on the shoulders of the threaded connection.

Further, the seal arrangement of the present invention will not interfere with internal drill string tubular bore activities such as wire line operations, including logging tools and the like. It provides a sealing arrangement which locks in place and is adaptable to form a seal even where there are nominal variations in tool joint pin length. The seal arrangement will not fall out nor can it be readily dislodged, and does not cause interference with make-up or break-out of the joint or with standard drill string tubular member rig handling activities.

New or old tubular members can be readily retrofitted with the seal arrangement of the present invention.

Other objects and advantages of the present invention will become more readily apparent from a consideration of the following drawings and descriptions.

BRIEF DESCRIPTION OF THE DRAWINGS

FIG. 3 is a one-half sectional view illustrating a threaded connection between tubular members with a box of slightly different configuration and the present invention employed therewith;

FIG. 4 is a one-quarter sectional illustrating the position of the seal arrangement of the present invention in the box of the FIG. 3 threaded connection before the seal arrangement is engaged by the pin end of the tubular member;

FIG. 5 is a one-half sectional view illustrating a pin and box shouldered, threaded connection wherein the box is of a still different configuration and an embodiment of the present invention which may be employed therewith;

FIG. 6 is a one-quarter sectional view illustrating the seal arrangement of FIG. 5 prior to its engagement and activation by the pin end of the tubular member;

DESCRIPTION OF THE PREFERRED EMBODIMENTS

Figure 1:
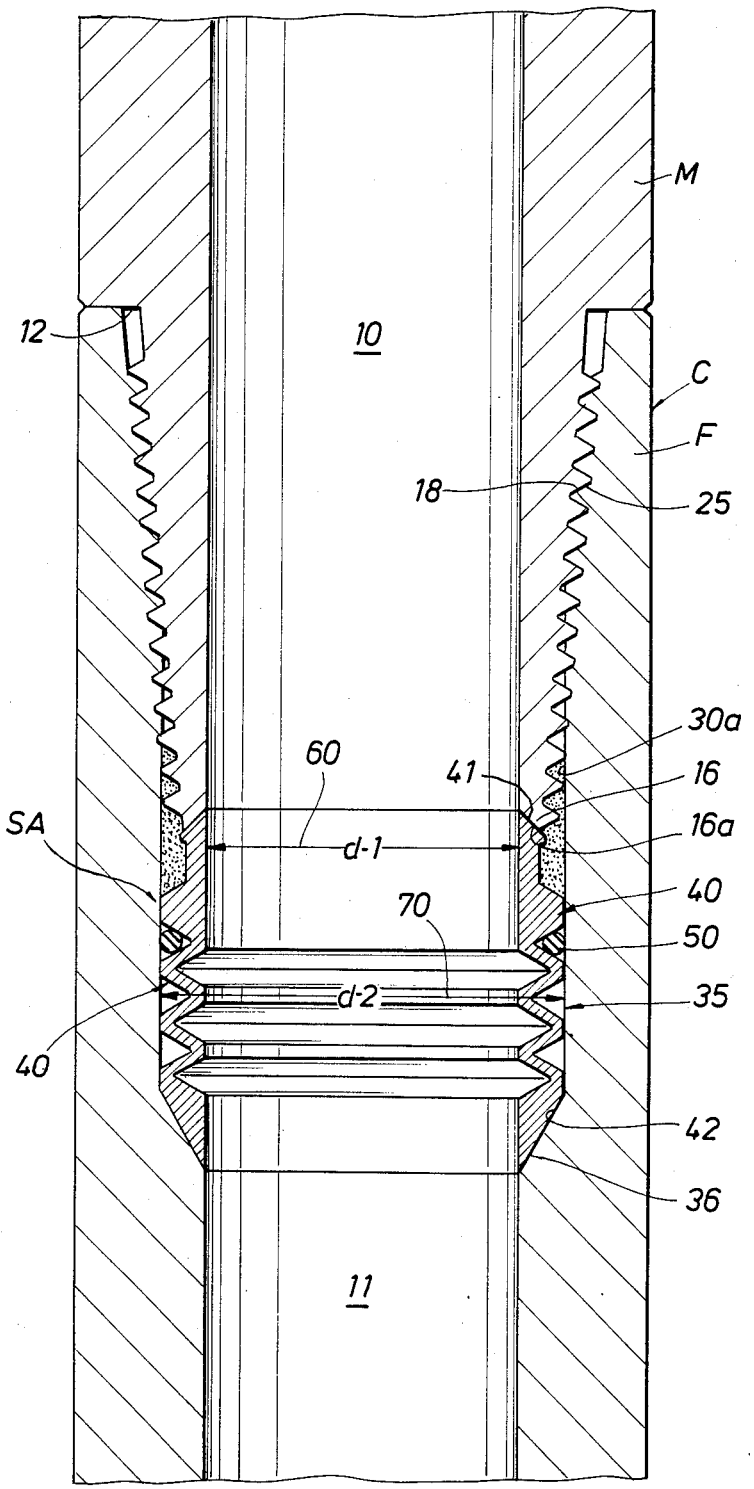
FIG. 1 is a one-half sectional view illustrating the present invention employed in a shouldered, threaded connection where the box is of one type configuration.
Figure 2:
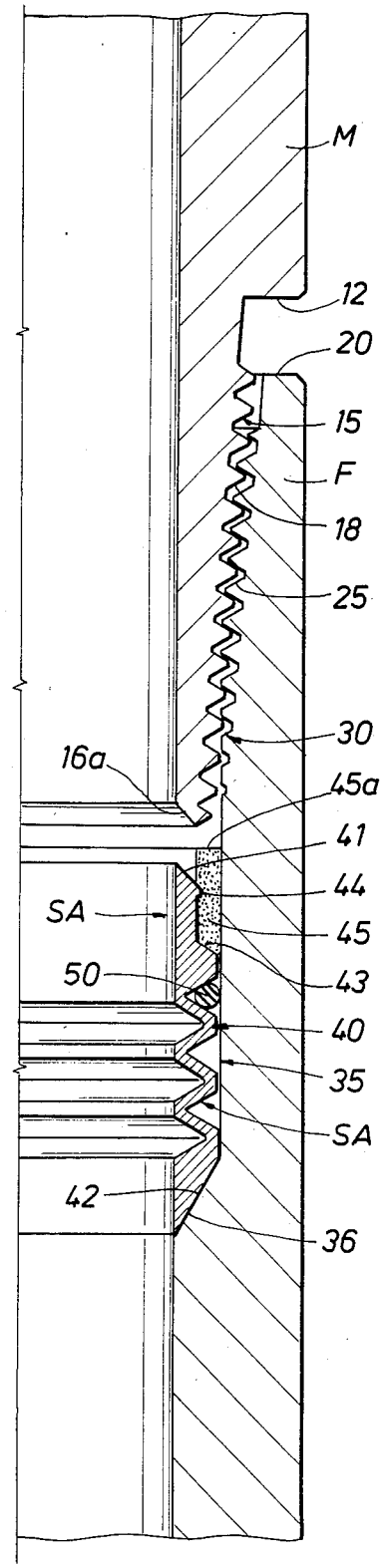
FIG. 2 is a one-quarter sectional view illustrating the position of the seal arrangement of the present invention in the box of the FIG. 1 threaded connection before the seal arrangement is engaged by the pin end of the tubular member as shown in FIG. 1.

The present invention will be described in detail as it relates to its use in shouldered, pin and box threaded connections employed in drill strings, such as drill pipe, drill collars and the like. However, such explanation is by way of example only, as the present invention may be employed in any type of pin and box shouldered, threaded tubular member connection as may be desired.

In the drawings a shouldered, threaded connection between tubular members M and F is represented by the letter C. The male tubular member M is provided with an annular shoulder 12 which reduces the outer diameter of the tubular member M adjacent one end thereof to form what is normally termed the pin of the tubular member which pin is represented at 15 and is provided with exterior threads 18 thereon as shown in the drawings. The female tubular member F terminates in the annular shoulder 20 and is threaded internally as represented at 25 from adjacent the shoulder 20 a suitable distance to form what is normally termed in the art the box 30.

Some threaded connections may be provided with what is termed a bore back represented generally at 35 in the drawings which may assume any of several configurations several of which are shown in the drawings. FIGS. 5 and 6 represent a more common threaded connection such as found in typical commercial threaded joints of tubular members employed in production and casing strings for oil and gas wells.

The tubular members M and F are provided with internal longitudinal bores 10 and 11 extending therethrough for conducting drilling fluids and well tools or the like through the tubular members during drilling and production operations as desired.

During make-up of the threaded tubular connections C as the well string is lowered into the well bore, various types of devices have been proposed and are in use in order to attempt to make up the pipe to the recommended torque to obtain proper engagement of the shoulders 12 and 20 to attempt to effect a seal therebetween. Quite often in such operations, due to irregularities on the shoulders 12 or 20 or for other reasons, either too much torque is applied which may damage the shoulders and prevent proper sealing, or not enough torque is applied so as to properly engage and effect a seal at the shoulders 12 and 20.

Where the threaded connection C is employed in tubular members employed in drilling in oil or gas wells such as drill pipe, drill collars and the like, drilling fluid under pressure is circulated through the bores 10 and 11 and discharged out the bit at the lower end thereof in a manner well known. Where no seal is provided in the threaded connection, such drilling fluid communicates along the engaged threads 18 and 25 to the abutted shoulders 12 and 20 as represented in the drawings, and if there is improper sealing due to any condition, the threaded connection will begin to weep, or leaks, and in a relatively short period of time will washout due to the pressure of the drilling fluid and its characteristics. When a washout occurs, the drill string must be removed from the well bore and the tubular members at the threaded connection where the wash-out occurs replaced. It can be appreciated that such operation is expensive and time consumming.

In some instances the length of the pin end 15 on the male tubular member M will vary from one drill joint to the other as much as ⅛ inch or more. This also causes problems in trying to provide a seal arrangement which may be readily used with various tubular members and effectively engage and seal between the pin and box of a threaded connection C while accommodating various pin lengths on the male tubular member M.

Another problem in trying to properly effect and maintain a seal in a shouldered, threaded connection between adjacent tubular members is that the fluid pressure conducted through the tubular members M and F is effective at the abutted shoulders 12 to create a stress build-up in the tool due to such fluid pressure loading which causes problems well known to those skilled in the art.

Some seal arrangements heretofore provided between threadedly connected tubular members have incorporated a seal provided in an inwardly facing groove which is exposed to the fluid pressure in the threadedly connected tubular members and is also exposed to contact with various types of well tools and other objects passed through the tubular members during drilling or production operations. In such arrangements the seals may become dislodged and thus rendered ineffective.

The seal arrangement designated SA in the drawings of the present invention is intended to overcome the above and other problems presently encountered in seal arrangements heretofore employed in threaded tubular members employed in oil and gas well drilling and producing operations.

The seal arrangement SA includes an annular piston, or retainer means, referred to generally at 40 for positioning in the box end 30 of the female tubular member F. As shown, it is cylindrical and open at both ends. Resilient seal means 45 are provided for positioning on the piston means 40 to be supported and retained thereby. Any suitable fluoroelastomer or flurocarbon material which will function under the temperatures and pressures involved can be employed as the resilient seal means 45.

Additional seal means 50 is provided for positioning on the piston and retainer means 40 and is responsive to fluid pressure in the tubular members when the threaded connection C has been made up to aid in maintaining and urging the piston and retainer means in sealing engagement with the first tubular member pin end 16 and the resilient seal means 50.

An annular and upwardly facing, tapered surface 41 is provided on the upper end of the retainer and piston means 40 which sealingly abuts and engages the annular tapered and downwardly facing surface 16a on the end 16 of the pin end 15. An annular tapered, downwardly facing surface 42 is provided in the lower end of the piston and retainer means 40 which rests on the upwardly and inwardly tapered surface 36 of the bore back 35 to assist in seating and positioning the piston and retainer means 40 within the bore back 35 to aid positioning and retaining the seal arrangement SA in position between the tubular members M and F to seal off the threaded connection C and the abutting shoulders 12 and 20 from fluid in the bores 10 and 11 of the tubular members.

The piston and retainer means 40 also includes a surface 43 on which the resilient seal means 45 is received. An annular, generally radially projecting edge or suitably shaped prong 44 on the piston and retainer means 44 engages the resilient seal means 45 as shown in the drawings to assist in retaining it in position while the seal arrangement is positioned in the tubular member F and during engagement of the threaded connection C. This assists in maintaining the components of the seal arrangement SA properly positioned after the threaded connection has been disconnected and ready for receiving a different tubular member M in the tubular member F as will be described.

It will be noted that initially the seal means 45 is shown being in the form of an annular ring as illustrated in FIGS. 2, 4, 6 and 8 of the drawings, before the threaded connection is made up. After the lower end 16 of the pin 15 has been threaded into the box 30 sufficiently, engagement of the pin end 16 with the annular upper surface 41 of the piston means 40 is effected as well as engagement with the upper end 45a of the resilient seal means 45 to deform the resilient seal means 45 and effect extrusion or deformation thereof between the threads 18 on the pin end and the inner surface 30a of the box 30 adjacent the lowermost threads on the pin end 16 of the tubular member M as shown.

The piston and retainer means 40 is formed of any suitable material such as stainless steel, inert plastic, or the like which will withstand the temperatures and pressures involved and which can be machined to form the sealing surface 41 and seat 42 thereon.

When the tubular members M and F have been threadedly connected and shouldered as illustrated in FIGS. 1, 3, 5 and 7 of the drawings, it can be appreciated that the seal which is responsive to internal fluid pressure in tubular members M and F has been shifted from the abutting shoulders 12 and 20 to the surface 16a on the pin 15 and the upper and inwardly tapered surface 41 on the piston means 40 which is of smaller diameter than the seal at shoulders 12 and 20. The effective diameter of the seal at surfaces 41 and 16a is represented by the horizonal line d-1, which represents the area at the seal effected by the surfaces 41 and 16a responsive to fluid pressure, and which diameter bears the reference numeral 60. The area at the second pair of sealing surfaces which is responsive to the fluid pressure in the bores 10 and 11 of members M and F is represented at d-2 and identified by the referenced numeral 70. It is formed by additional seal means 50, piston means 40 and inner surface 30a of box 30. The diameter of the sealed surfaces at d-2 is greater than the diameter of the sealed surfaces at d-1, and this provides a sealed area at d-2 which is greater than that at d-1 responsive to fluid pressure in the bores 10 and 11 of the tubular members M and F. The fluid pressure in the bores 10 and 11 of the threaded connection C acts on the differential area between the sealed surfaces at d-1 and d-2 to urge the piston means 40 upwardly within the box and thereby maintain the surfaces 41 and 16a in sealing engagement and to maintain the resilient seal means 45 in sealing relation with the piston means 40, pin 15 and box 30.

From the foregoing, it can be seen that the present invention provides a seal arrangement SA, which is initially activated by mechanical force, that is, the lower end 16 of pin 15 engaging the resilient seal means 45 as above described and the upper end of piston means 40 to effect a seal between the tubular members M and F and piston means 40 adjacent the threaded connection C. Additionally, the seal means SA is then activated or energized and maintained in active engagement by fluid pressure within the tubular members M and F acting on the differential area provided by the foregoing arrangement between the seal surfaces 41, 16a and the seal means 50 on piston means 40 and the inner surface 30a of the bore back 35 which tends to urge the piston means 40 upwardly into engagement with the lower end 16 of the pin 15 and the resilient seal means 45.

It will be noted that the form of the seal arrangement illustrated in FIGS. 1-4 as well as in FIGS. 5, 6, 7 and 8 include the components described above with regard to FIGS. 1 and 2 and function in generally the same fashion to energize or activate the sealing arrangement SA of the present invention. Like numerals are applied to similar components in each of the drawings.

In the FIGS. 1-4 embodiment the piston means 40 is illustrated as having a plurality of convolutions 40a extending annularly and spaced longitudinally of the piston means 40 to form a bellows-like member 40b. Thus, the piston means 40 includes a longitudinally extending portion which is resilient to further accommodate varying lengths of pin ends on the tubular member M.

Figure 7:
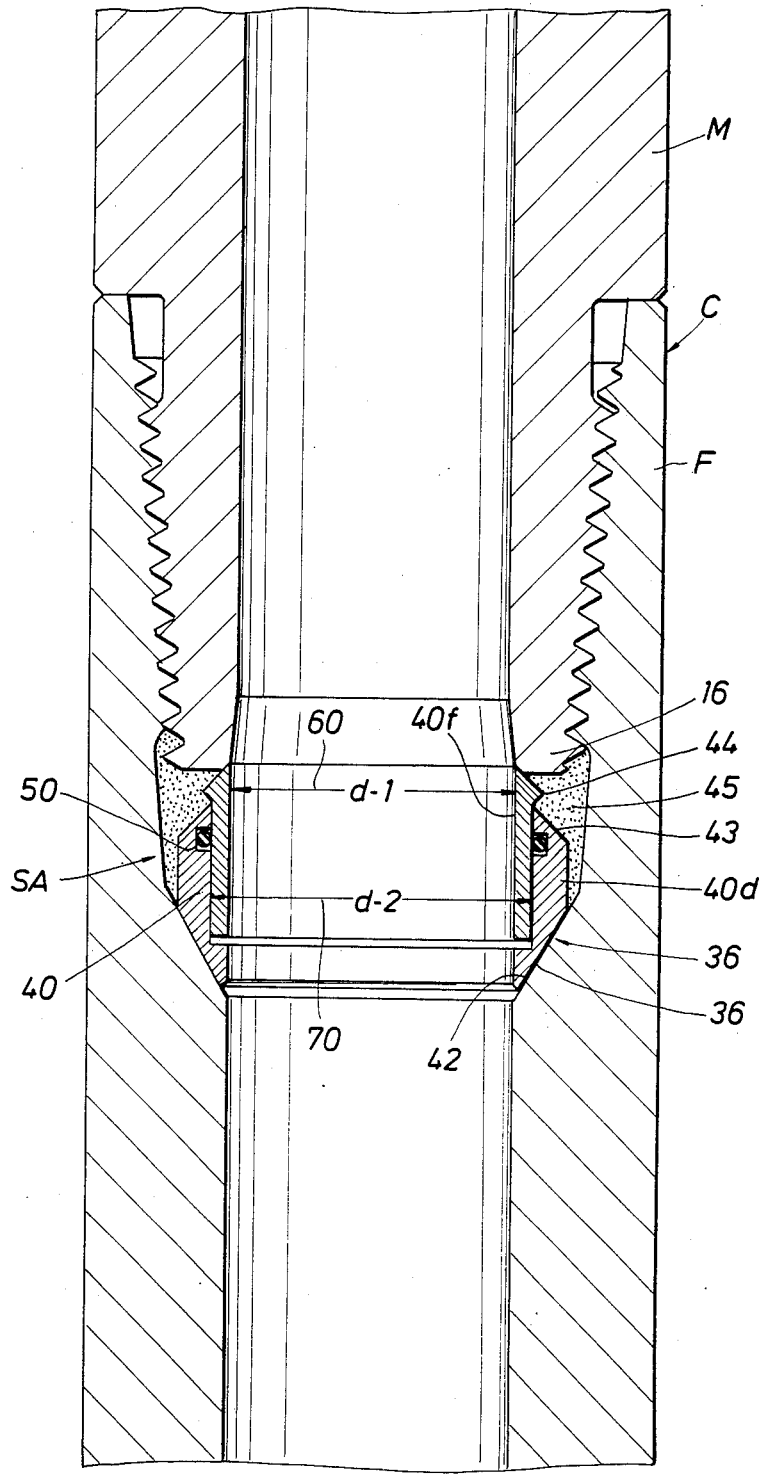
FIG. 7 is a one-half sectional view illustrating a pin and box shouldered, threaded connection wherein the box is still another configuration and a form of the present invention which may be employed therewith.
Figure 8:
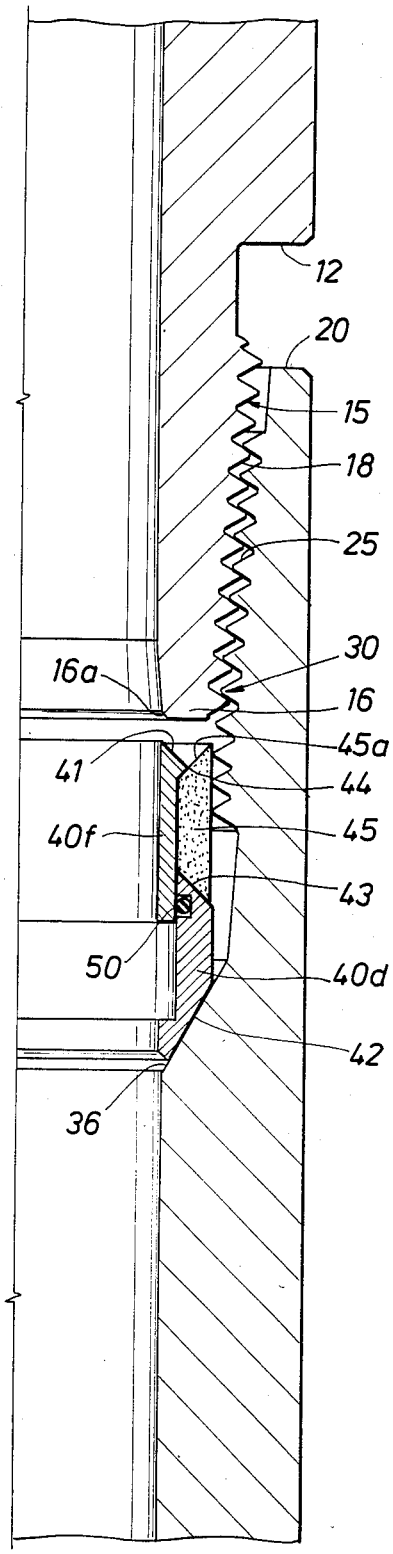
FIG. 8 is a one-quarter sectional view illustrating the seal arrangement of FIG. 7 in position and prior to its engagement and activation by the pin end of the tubular member.

In FIGS. 5-8 inclusive the piston and retainer means 40 is shown as also being in the shape of a cylindrical ring which in FIGS. 5 and 6 is shown as being a single member and is shown in FIGS. 7 and 8 as being form of two relatively movable and telescoping members. More particularly, in FIGS. 7 and 8 the piston and retainer means 40 includes an outer cylindrical member 40d having an upward facing surface 43 on which the resilient seal means 45 may be received and supported as shown in FIG. 7 of the drawings. A second annular ring 40f is slidably received within the ring member 40d and is provided with the annular projecting surface 44 for engaging the resilient seal means 45 to aid in positioning and retaining the ring 40f during installation. After the seal 45 is deformed, the interengagement of seal means 45 and ring 40f is maintained by the sharp, or pointed annular projection 44.

The additional seal means 50 in the FIGS. 7 and 8 modification, seals between the outer and inner cylindrical members 40d, 40f respectively as shown and may be arranged in any suitable manner such as in the annular groove 53 and the outer member 40d.

From the foregoing it can be seen that the seal arrangement SA of the present invention enables the resilient seal means 45 and the additional seal 50 to be completely isolated from the bore 10 and 11 of the tubular members M in a manner so as to be less likely to be washed out by fluid pressure in the bores 10 and 11. Also, logging tools, and any other type device may be moved readily through the tubular member without fear of contacting the resilient seal 45 or additional seal 50 so as to dislodge or displace them. By isolating the seal means 45 so as to seal between the pin and box as well as the piston or retainer means 40, the threads on each the pin 15 and box 30 are completely isolated from fluid pressure within the tubular members, as are the shoulders 12 and 20 thereby greatly reducing the stress build-up heretofore encountered by attempting to maintain a seal at the shoulders 12 and 20. Further, by positioning the additional seal means 50 on a larger diameter relative to the seal formed by the surfaces 41 and 16 and which is also responsive to fluid pressure in the tubular members, the fluid pressure is employed to urge and maintain in a proper seal.

When the tubular members M and F are threadedly disconnected, the seal arrangement SA of the present invention may be positioned in another box end 30 of a female member F or it may be retained in position in the same tubular member F for connection with yet another male member M whose pin 15 may be slightly shorter or slightly longer than the pin of the previously male member M threadedly engaged with the female member F. Even though there may be a difference in length on the pin 15 of the male tubular member M, the seal arrangement SA of the present invention accommodates such varying length by reason of the resilient nature of the resilient seal means 50 as well as the structural arrangement of the piston and retainer means 40 so as to properly engage and seal between the tubular members M and F even though there may be a nominal varying pin end length from one tubular member M to another.

The foregoing disclosure and description are illustrative and explanatory of the invention, and various changes in the size, shape and materials as well as the details of the illustrated instructions may be made without departing from the spirit of the invention.

What is claimed is:

1. A sealing arrangement for sealing a threaded connection formed adjacent the abutting shoulders of tubular members wherein a first tubular member is provided with exterior threads on a projecting pin extending from the shoulder thereon which exterior threads are engageable with internal threads in the box of a second tubular member to form the threaded connection comprising:
   annular longitudinally resilient piston means for positioning in the box of the second tubular member;
   resilient means supported on said piston means for positioning between said piston means and the tubular members, said resilient means being responsive to engagement by the pin of the first tubular member to form a seal between the pin and box of the tubular members and piston means; and
   additional seal means on said piston means which is responsive to fluid pressure in the tubular members to urge said piston means into sealing engagement with the first tubular member pin and the resilient seal means.

2. The sealing arrangement of claim 1 wherein said piston means is constructed and arranged to sealingly engage the pin of the first tubular member when the first tubular member is threadedly made up and shouldered with the box of the second tubular member and wherein said additional seal means is between said piston means and the second tubular member to seal therebetween.

3. The sealing arrangement of claim 1 wherein said piston means includes a bellows and wherein said additional seal means is adjacent the upper end of said bellows and between said bellows and second tubular member.

4. The sealing arrangement of claim 1 wherein the pin of the first tubular member is provided with an upwardly and inwardly, annular tapered surface and wherein said piston means is provided with a downwardly and outwardly, annular tapered surface for sealingly engaging with the pin of the first tubular member.

5. The sealing arrangement of claim 1 wherein said piston means includes a plurality of longitudinally spaced convolutions to form a longitudinally extending resilient body portion.

6. The sealing arrangement of claim 1 wherein said piston means is a cylindrical member having a lower portion and an upper portion, with the lower portion being of greater thickness than the upper portion and wherein said additional seal means is carried by said lower portion.

7. The sealing arrangement of claim 6 wherein said upper portion of said piston means, upon engagement by the pin end of the first tubular member, telescopes downwardly into the lower portion for sealingly engaging with said additional seal means.

8. The sealing arrangement of claim 7 wherein said additional seal means faces inwardly on said lower portion of said annular piston means.

9. A sealing arrangement for sealing a threaded connection formed adjacent the abutting shoulders of tubular members wherein a first tubular member is provided with exterior threads on a projecting pin extending from the shoulder thereon which exterior threads are engageable with internal threads in the box of a second tubular member to form the threaded connection comprising:
   annular piston means for positioning in the box of the second tubular member and sealably engageable with the pin of the first tubular member when the first and second tubular members are threadedly connected together;
   resilient seal means supported on said piston means for positioning between said piston means and the tubular members, said resilient means being responsive to engagement by the pin of the tubular member to form a seal between the pin and box of the tubular members and piston means;
   additional seal means on said piston means forming a larger sealed surface responsive to fluid pressure in the tubular members than the sealed surface formed by the piston means sealably engaged with the pin of the first tubular member whereby fluid pressure in the tubular members urges said piston means into sealing engagement with the pin end of the first tubular member.

10. The sealing arrangement of claim 2 wherein the diameter of the seal formed between the pin of the tubular member and piston means is smaller than the diameter of the seal formed by said additional seal means between said piston means and the second tubular member.

11. A method of sealing between the threaded pin and box end in the fluid conducting bore of male and female shouldered tubular members comprising:
   positioning an annular member in the box of the female tubular member, the annular member having a first seal surface on one diameter of the annular member for sealably engaging the pin end of the male tubular member and a second seal surface on a larger diameter of the annular member for sealably engaging in the bore of the female member;
   threadably engaging the pin and box end; and
   supplying fluid pressure in the bore to act on the differential area formed by the two diameters to urge the annular member into sealing engagement with the pin and box on the male and female member respectively.

12. A sealing arrangement for sealing a threaded connection formed adjacent the abutting shoulders of tubular members wherein a first tubular member is provided with exterior threads on a projecting pin extending from the shoulder thereon which exterior threads are engageable with internal threads in the box of a second tubular member to form the threaded connection comprising:
   annular longitudinally resilient piston means for positioning in the box of the second tubular member;
   spaced seal means associated with said piston means for sealing between said piston means, pin and box whereby fluid pressure in the tubular members urges piston means and seal means into sealing relationship with the pin and box.

* * * * *